(12) United States Patent
Konuma

(10) Patent No.: US 9,152,893 B2
(45) Date of Patent: Oct. 6, 2015

(54) IMAGE FORMING APPARATUS AND DISPLAY APPARATUS

(71) Applicant: Konica Minolta, Inc., Chiyoda-ku (JP)

(72) Inventor: Shigeo Konuma, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/096,245

(22) Filed: Dec. 4, 2013

(65) Prior Publication Data
US 2014/0085678 A1  Mar. 27, 2014

Related U.S. Application Data

(63) Continuation of application No. 12/862,385, filed on Aug. 24, 2010, now Pat. No. 8,625,134.

(30) Foreign Application Priority Data

Aug. 28, 2009  (JP) .................................. 2009-198907

(51) Int. Cl.
*G06F 3/12* (2006.01)
*H04N 1/00* (2006.01)
*G06K 15/02* (2006.01)
*G06K 15/00* (2006.01)
(Continued)

(52) U.S. Cl.
CPC .......... *G06K 15/1806* (2013.01); *H04N 1/0035* (2013.01); *H04N 1/00408* (2013.01); *H04N 1/00472* (2013.01); *H04N 1/00477* (2013.01); *H04N 1/00482* (2013.01); *H04N 1/00954* (2013.01); *H04N 2201/0094* (2013.01)

(58) Field of Classification Search
CPC ............. G06F 1/00; G06F 15/00; G06F 3/12; G06F 3/038
See application file for complete search history.

(56) References Cited

U.S. PATENT DOCUMENTS

| | | | |
|---|---|---|---|
| 8,243,311 B2 | 8/2012 | Yoshimura | |
| 2002/0057455 A1 | 5/2002 | Gotoh et al. | |

(Continued)

FOREIGN PATENT DOCUMENTS

| | | |
|---|---|---|
| CN | 101424896 A | 5/2008 |
| CN | 101321220 A | 12/2008 |

(Continued)

OTHER PUBLICATIONS

Search Report issued in corresponding European Patent Application No. 10173377.2, dated Jul. 23, 2012.
(Continued)

*Primary Examiner* — Fred Guillermety
*Assistant Examiner* — Henok A Shiferaw
(74) *Attorney, Agent, or Firm* — Buchanan Ingersoll & Rooney PC

(57) ABSTRACT

An image forming apparatus includes a plurality of sheet trays; an image forming section which forms an image on a sheet supplied by the sheet trays; and a display section which includes a display screen, upon which are displayed a first axis and a second axis, wherein sheet tray information identifying each of the plurality of sheet trays is displayed individually for each tray along the first axis, and information concerning the time period scheduled for use of each of the sheet trays is displayed along the second axis at a position along the first axis where the sheet tray information for the respective sheet tray is located.

13 Claims, 11 Drawing Sheets

(51) Int. Cl.
*G03G 15/00* (2006.01)
*G06F 17/00* (2006.01)

(56) References Cited

U.S. PATENT DOCUMENTS

| | | | |
|---|---|---|---|
| 2003/0058468 | A1 | 3/2003 | Couwenberg et al. |
| 2004/0218197 | A1* | 11/2004 | Vliembergen et al. ........ 358/1.6 |
| 2005/0243365 | A1 | 11/2005 | Noda |
| 2005/0270566 | A1 | 12/2005 | Tanaka |
| 2006/0044594 | A1 | 3/2006 | Shirai |
| 2006/0123360 | A1 | 6/2006 | Anwar et al. |
| 2006/0197977 | A1 | 9/2006 | Miyata |
| 2007/0201079 | A1 | 8/2007 | Caine |
| 2007/0291286 | A1* | 12/2007 | Utsunomiya et al. .......... 358/1.8 |
| 2008/0307355 | A1 | 12/2008 | Yokota |
| 2009/0006998 | A1 | 1/2009 | Neeleman et al. |
| 2009/0116058 | A1* | 5/2009 | Yoshimura ................... 358/1.15 |
| 2010/0091324 | A1 | 4/2010 | Kohama |
| 2011/0051187 | A1* | 3/2011 | Konuma ...................... 358/1.15 |

FOREIGN PATENT DOCUMENTS

| | | |
|---|---|---|
| EP | 1 473 661 A | 11/2004 |
| JP | 2002-063005 A | 2/2002 |
| JP | 2002-149388 A | 5/2002 |
| JP | 2003-036148 A | 2/2003 |
| JP | 2004-199696 A | 7/2004 |
| JP | 2004-348713 A | 12/2004 |
| JP | 2006-164260 A | 6/2006 |
| JP | 2007-226571 A | 9/2007 |
| JP | 2008-305397 A | 12/2008 |
| JP | 2009-515191 A | 4/2009 |
| JP | 2010-092393 A | 4/2010 |

OTHER PUBLICATIONS

Office Action issued in corresponding Chinese Patent Application No. 201010263815.0, mailed Jul. 12, 2012, and English translation thereof.

Japanese Notice of Reasons for Refusal dated Mar. 27, 2013 issued in the corresponding Japanese Patent Application No. 2009-198907 and English language translation.

Office Action (Notification of the Second Office Action) dated Jan. 29, 2013, issued by the Chinese Patent Office in the corresponding Chinese Patent Application No. 201010263815.0 and an English translation thereof (7 pages).

* cited by examiner

FIG. 6

IMAGE FORMING APPARATUS AND DISPLAY APPARATUS

CROSS REFERENCE TO RELATED APPLICATION

The present application is a continuation of U.S. Ser. No. 12/862,385, filed on Aug. 24, 2010, and which is based on Japanese Patent Application No. 2009-198907 filed with Japanese Patent Office on Aug. 28, 2009, the entire content of which is hereby incorporated by reference.

BACKGROUND OF THE INVENTION

1. Technical Field

The present invention relates to an image forming apparatus and an image forming method for forming an image on a recording sheet. In details, it relates to the apparatus and method that, in cases where a display scale of a display screen is reduced, display job images of two or more jobs having been displayed on a display screen, as overlapped images at a same display area, and enable to select each of the overlapped images of the jobs.

2. Background Technology

In recent years, image forming apparatuses such as a digital multifunctional peripheral provided with a copier function, scanner function, printer function and a facsimile function are commonly used. The operation of the image forming apparatus is conducted by the use of a display device having a touch panel type operation function provided on the image forming apparatus main-body, or a key board or a mouse of a computer connected via LAN, to the image forming apparatus and the like.

For example, in cases where a user operates the image forming apparatus by operating the touch panel, information is inputted by touching a finger or a touch pen on the display screen. In this case, since the touch panel does not have a left button or a right button unlike the mouse, left click operation, right click operation or drug operation cannot be conducted.

In Unexamined Japanese Patent Application Publication No. 2007-226571 (Patent Document 1), disclosed is an electronic apparatus which, in the case of executing the touch panel operation, displays a pointer at the touched position of operation items (button, etc.) displayed on the screen, and displays a selection menu for executing the operations of left click, right click or drug and the like. According to this apparatus, the similar operational movement as the left click, right click or drug operation by the mouse can be performed by the selection from the selection menu.

Meanwhile, in the electronic apparatus described in the Patent Document 1, sizes of buttons and the like which are operation objects on the screen of display are usually determined by considering the operation of touch panel and the operation of mouse. However, regarding the object whose size and position cannot be unambiguously determined due to scale change and the like on the screen, the above-described configuration cannot be employed.

For example, in the screen configuration to display, on a horizontal axis taken as a time axis, a reserved job (job bar) in a size corresponding to a time scale, the job (job bar) itself may become invisibly small size on the screen when the scale of horizontal time axis is change to be a scale of large unit. Further, in cases where these kinds of jobs exist in succession, a status arises where a plurality of jobs exist in a size of one dot which being the minimum unit on the screen. In such cases, a user needs operations to change the display scale in order to make the jobs visible and selectable size.

In view of the above problem, an object of the present invention is to provide an image forming apparatus and an image forming method that enables to obtain required information without degrading operability, even in cases where the change of display scale is not appropriate.

SUMMARY

In order to solve the above mentioned problem, an image forming apparatus reflecting one aspect of the present invention for executing a printing based on a job having job setting information, including:

a display section which displays two or more job images on a screen, each of the job images representing each of two or more jobs;

an operation section for changing a display scale of the two or more job images displayed on the display section; and a control section which controls to display the two or more job images having been displayed on the screen of the display section, as overlapped images in a same display area, based on an operation of changing the display scale in the screen, wherein the control section enables to select each of the overlapped job images displayed in the same display area on the screen.

The image forming apparatus, wherein the control section is preferably configured to display the job setting information correlated to either one of the two or more job images on the screen of the display section, when the overlapped job images displayed in the same display area are selected.

The image forming apparatus, wherein the control section is preferably configured to allow the display section to display an operation screen for displaying the job setting information correlated to another job than the job correlated to the job setting information having been displayed on the display section.

The image forming apparatus, wherein the control section is preferably configured to display the job setting information correlated to another job than the job correlated to the job setting information having been displayed on the display section, when the overlapped job images displayed in the same display area are reselected.

The image forming apparatus is preferably display a job schedule screen where a screen for displaying the job image is configured to arrange a plurality of connecting sheet trays on one axis, and arrange a time axis as the other axis.

The image forming apparatus, wherein the control section is preferably configured to determine whether or not each display size of the two or more job images after having been changed in the display scale is not larger than a previously set minimum display unit, and in cases where the each display size of the job images is not larger than the minimum display unit, controls to display the job images as the overlapped images in the same display area.

A image forming method reflecting an aspect of the present invention is a method for executing a printing by utilizing an image forming apparatus which forms an image based on a job provided with job setting information, including the steps of: displaying two or more job images on a screen, each of the job images representing each of two or more jobs; operating for changing a display scale of the two or more job images displayed on the screen; controlling to display the two or more job images having been displayed on the screen, as overlapped images in a same display area, based on an operation of changing the display scale in the operating step; and enabling to select each of the overlapped job images displayed in the same display area on the screen.

BRIEF DESCRIPTION OF THE DRAWINGS

These and other objects, advantages and features of the invention will become apparent from the following description thereof taken in conjunction with the accompanying drawings in which:

FIG. 6 is a drawing that illustrates a configuration example of a job schedule screen after a change of display scale (example 1);

DETAILED DESCRIPTION OF THE PREFERRED EMBODIMENT

Hereinafter, the preferred embodiment for enforcing the present invention will be described.

[Configuration Example of Image Forming System]

Figure 1:
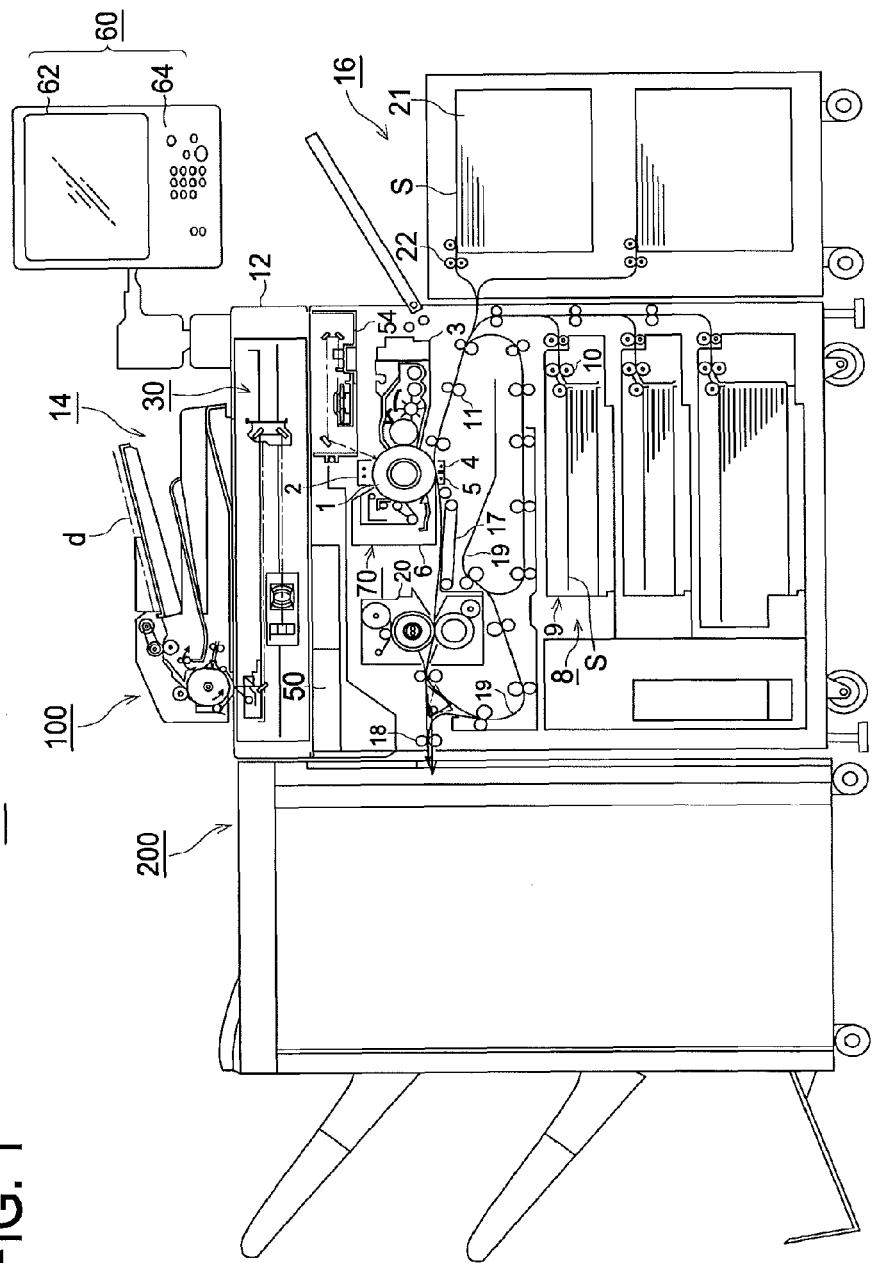
FIG. 1 is a drawing that illustrates a configuration example of an image forming system relating to an embodiment of the present invention.

As shown in FIG. 1, image forming system GS is provided with large capacity paper supply apparatus 16, image forming apparatus (digital multi-functional peripheral) 100 relating to the present invention and post-processing apparatus 14. Image forming apparatus 100 has image forming apparatus main-body 12 and automatic original document feeding apparatus 14. Automatic original document feeding apparatus 14 arranged on the upper surface portion of image forming apparatus main-body 12 conveys original document d placed on automatic original document feeding apparatus 14 onto original platen of image forming apparatus main-body 12.

Image forming apparatus main-body 12 has operation display section 60, scanner section 30, reading processing section 50, writing processing section 54, printer section 70, sheet supply and conveying unit 8, and fixing section 20. Operation display section 60 is a touch-panel type input device, and rotatably fixed via a hinge on the upper surface portion of image forming apparatus main-body 12. For example, a display scale is changed by operating the operation screen displayed on display section 62 such as job schedule screen 300, by the use of operation section 64 including a cursor and a button and the like.

Scanner section 30, which is for example provided with an optical scanning light exposure unit having CCD image sensor 32 (see FIG. 2) and the like, irradiates light on original document d conveyed on to the original document platen, reads the reflection light with CCD image sensor 32, and converts the read-in reflection light into analogue image signals. Reading processing section 50 executes an analogue processing, an ND conversion processing, and a shading correction processing onto the analogue image signals having been photo-electronically converted by scanner section 30, and outputs image data obtained by these processing.

Printer section 70 includes photosensitive drum 1, charging unit 2, developing unit 3, transfer unit 4, separation unit 5 and cleaning unit 6, in order for executing a reserved job which is, for example, to form an image on a sheet S based on the image data obtained from scanner section 30 and the image forming condition having been set.

Charging unit 2, developing unit 3, transfer unit 4, separation unit 5, and cleaning unit 6 and the like are arranged around photosensitive drum 1. Charging unit 2 uniformly charges the surface of photosensitive drum 1 before being written with image. Writing processing section 54 forms an electrostatic latent image on photosensitive drum 1 by irradiating a semiconductor laser beam to photosensitive drum 1 whose surface is uniformly charged. Developing unit 3 develops the electrostatic latent image, formed on photosensitive drum 1 by writing processing section 3, with a toner material. By this developing process, the toner image is formed on photosensitive drum 1.

Transfer unit 4 transfers the toner image onto paper sheet S conveyed from sheet tray 9 of sheet supply and conveying unit 8. Sheet S transferred with the toner image is separated from photosensitive drum 1 by separation unit 5, and conveyed to fixing unit 20. The toner material remained on photosensitive drum 1 is removed by cleaning unit 6.

Sheet supply and conveying unit 8 has a plurality of sheet tray 9, sheet supply (feeding) roller 10, conveying roller 11, transfer and conveying roller 17, ejection section 18 and sheet re-feeding section 19. Sheet S fed from each sheet tray 9 is conveyed by sheet feeding roller 10 and conveying roller 11 to transfer unit 4, and above mentioned toner image is transferred on the front surface of sheet S by transfer unit 4. Sheet S transferred with the toner image is conveyed to fixing unit 20 by transfer and conveying roller 17. Fixing unit 20 fixes the transferred toner onto front surface of sheet S by heating sheet S conveyed by transfer and conveying roller 17.

Sheet S applied with the fixing process is conveyed as it is to post processing apparatus 200 (or sheet ejection section 18) in cases of single face printing. In post processing apparatus, for example, a staple processing is executed. While, in cases of double face printing, sheet re-feeding section 19 conveys sheet S after being fixed through a switchback and sends again to transfer unit 4, and a prescribed image is transferred on the back face of said sheet S in printer section 70. And, sheet S formed with images on both faces is conveyed after fixing, toward post processing apparatus 200 and the like.

Large capacity paper supply apparatus 16 has a plurality of paper stacker 21 and conveyance roller 22 provided near the ejection opening of each paper stacker 21. Each of the plurality of paper stacker 21 is loaded with sheet S according to sizes of 8×11 type, A4 type, B5 type and the like. Sheet S loaded on each paper stacker 21 is successively conveyed by conveying roller 22 in prescribed timing to printer section 70 of image forming apparatus main-body 12.

[Block Configuration Example of Image Forming Apparatus]

Figure 2:
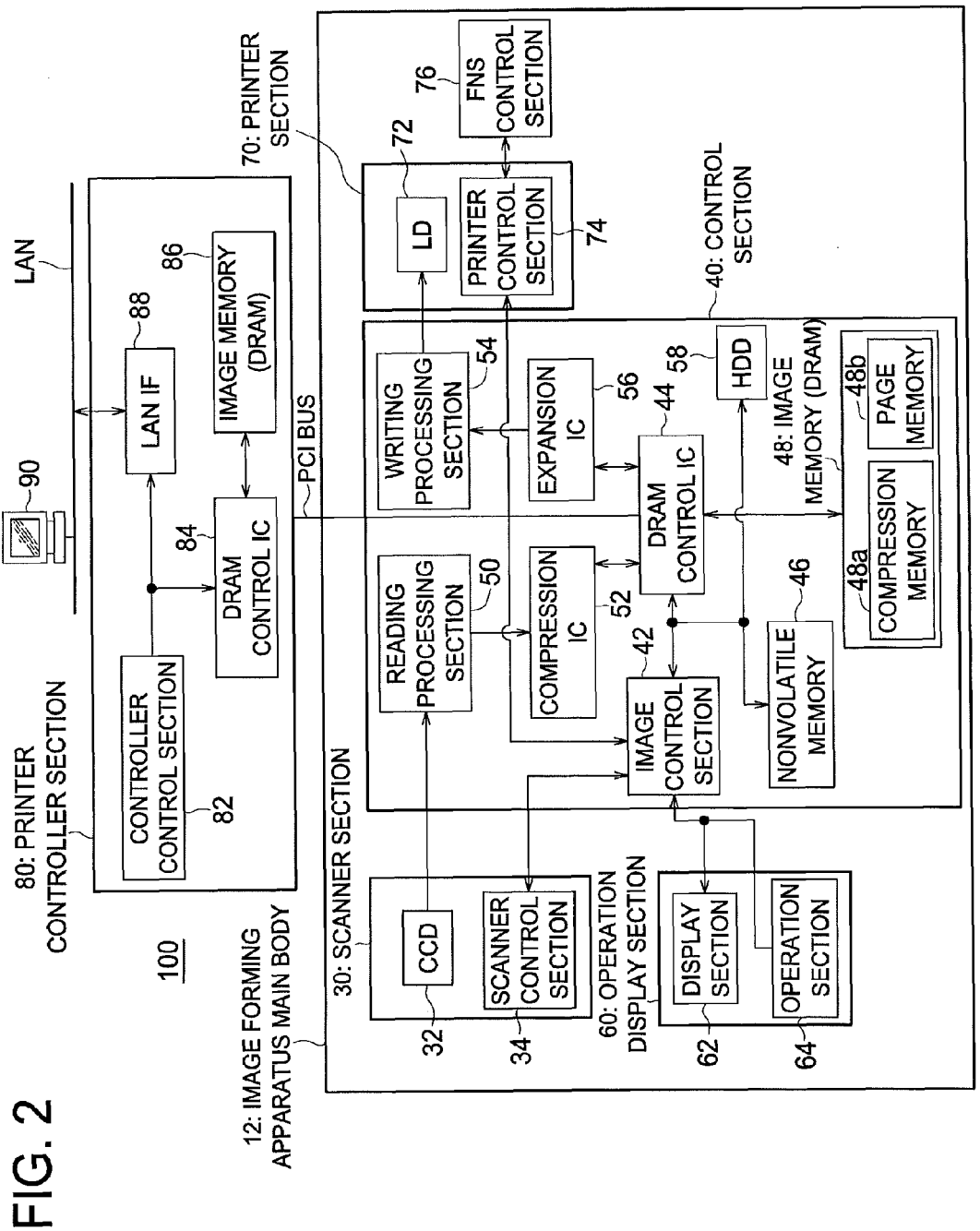
FIG. 2 is a drawing that illustrates a block configuration example of an image forming apparatus.

FIG. 2 illustrates a block configuration example of image forming apparatus 100. Image forming apparatus is provided with image forming apparatus main-body 12 and printer controller section 80. Image forming apparatus main-body 12 is configured with scanner section 30, control section 40, operation display section 60, and printer section 70.

Scanner section 30 has CCD image sensor 32 and scanner control section 34 to drive the CCD image sensor 32. Based on the control of scanner control section 34, CCD image sensor 32 reads analogue signals by optically scanning the surface of original document. Scanner control section 34 sends the analogue image signals read by CCD image sensor 32 to reading processing section 50.

Operation display section 60 has display section 62 and operation section 64. In the present example, operation section 60 is configured of a touch panel where display section 62 and operation section 64 are combined into a single body. Display section 62, for example, is configured of a liquid crystal display or a organic EL (electroluminescence) display, and displays a menu screen, job schedule screen 300 (see FIG. 3) and the like. Operation section 64 is configured of mouse, keyboard, or operation screen, and the like, and detects input information (position information) based on a selected prescribed item in cases where the prescribed item is operated with a touch operation or a cursor operation by a user on the job schedule screen 300 and the like.

Control section 40 controls each movement of scanner section 30, printer section 70, and operation display section 60, and control section 40 has image control section 42, DRAM control IC44, nonvolatile memory 46, image memory 48, reading processing section 50, compression IC52, writing processing section 54, expansion IC56, and HDD58.

Image control section 42 is configured with CPU (Central Processing Unit), RAM (Random Access Memory) and the like, and reads out various processing programs stored in nonvolatile memory 46 to extend on the RAM, and totally controls each processing movement of image forming apparatus 100.

Further, in cases where the display scale of the screen is reduced by the operation of operation section 64, image control section 42 determines whether the display size of job bar JB after having been changed in the display scale is not larger than a previously set minimum display unit or not. If display sizes of the two or more job bars JB are determined to be not larger than a previously set minimum display unit, image control section 42 displays said two or more job bars JB as the overlapped images in one and the same area.

Nonvolatile memory 46, which is configured with a semiconductor memory and the like, stores various programs to be executed by image control section 42 and information according to the image forming apparatus.

Image memory 48, which for example is configured with DRAM (Dynamic RAM), contains compression memory 48*a* and page memory 48*b*. Compression memory is for storing compressed image data of job schedule screen 300, job reselection screen 500 and the like, and page memory 48*b* is for temporarily storing uncompressed image data of print object before printing.

HDD58 stores a job generated by image processing apparatus 90 connected to image forming apparatus or printer controller, and the like. HDD58 stores a plurality of jobs (job1, job2, job3 . . . ). Each job includes overall information of the each job, information of page unit, and image data. The overall information of each job (hereinafter referred as "Job setting information") includes job identification number, used sheet tray information, sheet size information, and the like.

Reading processing section 50 processes analogue image signals, which are applied with photoelectric conversion by CCD image sensor 32, and outputs the image data to compression IC52. DRAM control IC44 allows compression IC52 to execute compression processing on the image data inputted from reading processing section 50, and allows compression memory 48*a* to store the compressed image data. DRAM control IC44 allows expansion IC56 to execute expansion processing on the compressed image data read out from compression memory 48*a* based on the control of image control section 42, and stores in page memory 48*b*. Further, DRAM control IC44 reads out the uncompressed image data from page memory 48*b*, and outputs to writing processing section 54. Writing processing section 54 processes the extended image data for writing on a recording sheet, and outputs to printer section 70.

Printer section 70 is configured with laser diode 72(LD) and printer control section 74, in addition to photosensitive dram 1, charging unit 2, developing unit 3, transfer unit 4, separation unit and cleaning unit 6 which are described on FIG. 1. Laser diode 72 irradiates a laser beam with prescribed intensity onto photosensitive dram 1 based on the image data outputted from writing processing section 54. Printer control section 74 controls laser diode 72, etc, based on control signals supplied from image control section 42.

FNS control section 76, which is connected to printer control section 74, controls a punching unit, shifting unit, stapling unit and the like provided in post processing apparatus 200.

Printer controller section 80, which has controller control section 82, Dram control IC84, image memory 86 and communication interface (I/F) 88, transmits image data from information processing apparatus 90 connected to LAN toward image forming apparatus main-body 12, in cases where image forming apparatus 100 is used as a network printer.

Controller control section 82 totally controls movement of each section in printer controller section, and outputs via LAN image data, etc, inputted from image processing apparatus 90 as a print job, according to movement conditions of image forming apparatus 100. Communication interface 88, which is an interface such as a NIC (Network Interface Card), a modem, and the like for connecting with a LAN, receives the image data of print object via LAN from image processing apparatus and outputs the received image data to DRAM control IC84.

DRAM control IC84 stores the image data received by communication interface 88 in image memory 86, and reads out the image data from image memory 86. Further, DRAM control IC84, which is connected with dram control IC44 of the main-body by PCI bus, reads out the image data of print object from image memory 86 and outputs the image data to DRAM control IC44, based on the instruction of controller control section 82.

Information processing apparatus 90, which is configured of for example a personal computer, creates job data based on job by user's operation, etc, and sends the job data via LAN to image forming apparatus 100. The job data based on job includes process information of the job, print instruction setting information, and the like.

[Configuration Example of Job Schedule Screen]

Next, an example of job schedule screen 300 is described. In the example, "selection" includes a selection by touch operation of a screen and a selection by cursor operation.

Figure 3:
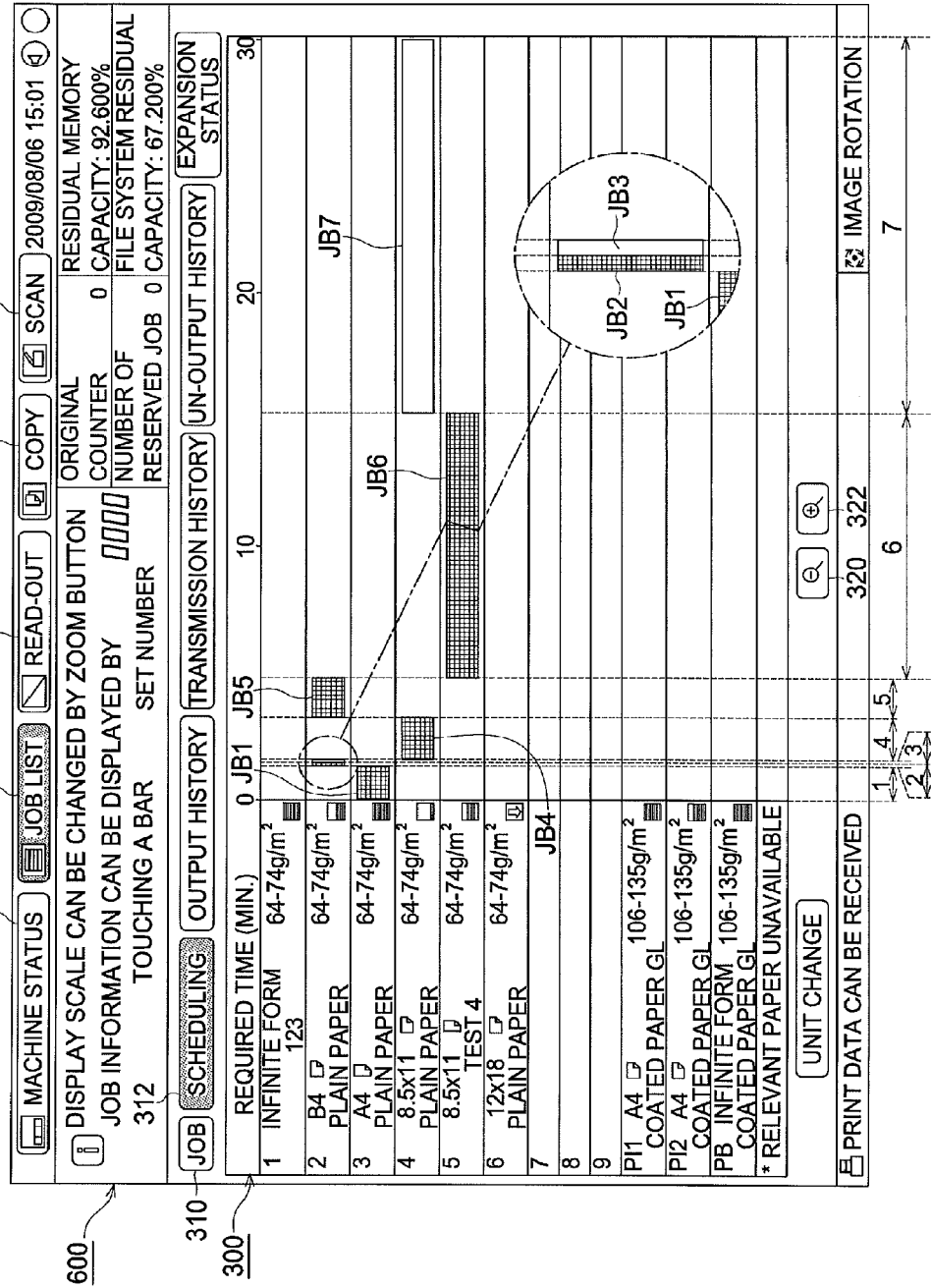
FIG. 3 is a drawing that illustrates a configuration example of a job schedule screen (example 1)
Figure 4:
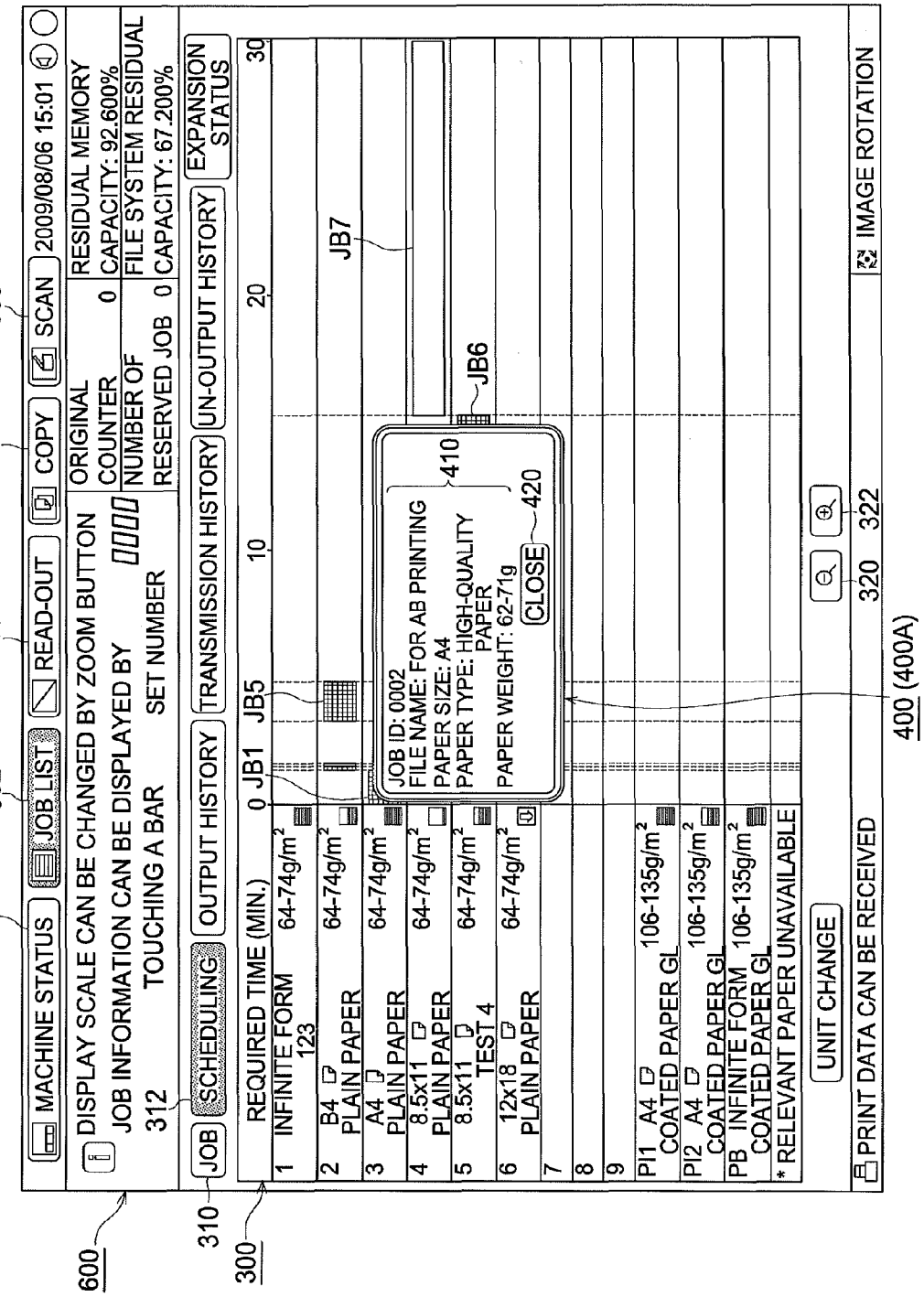
FIG. 4 is a drawing that illustrates a configuration example of a job schedule screen (example 2)

When power source of image forming apparatus 100 is activated, a menu screen (not illustrated) is displayed as an initial screen on display section 62. In upper portion of the menu screen, machine status button 301, job list button 302, read-out button 303, copy button 304, and scan button 305, are displayed. For example, when job list button 302 is selected on the menu screen, job control screen 600 is displayed. In FIG. 3, only the background of job control screen 600 is shown.

In the upper portion of job control screen 600, job button 310, scheduling button 312, etc are displayed. On this job control screen 600, for example, when scheduling button 312 is selected, schedule screen 300 is displayed in job control screen 600 as shown in FIG. 3.

Job schedule screen 300 is a screen for making predictable of user's action beforehand, such as sheet supplying and/or changing by visually notifying a residual time of each job, used sheet tray, residual amount of transfer sheet, machine stop timing, and the like. On the vertical axis of job schedule screen, connected sheet trays are arranged, and on the horizontal axis a time axis is arranged.

On the vertical axis indicating connected sheet trays of job schedule screen 300, pieces of sheet tray information (tray 1-tray 6) for sheet tray 9, etc, of image forming apparatus 100 and pieces of sheet tray information of post processing apparatus 200 connected to image forming apparatus 100 are displayed in order from the upper left side of job schedule screen 300. For example, at the column of tray 1 the sheet tray information of "infinite form" is displayed, at the column of tray 2 the sheet tray information of "B4 (lateral) plain paper" is displayed, at the columns of tray 3 the sheet tray information of "A4 (longitudinal) plain paper" is displayed. By these sheet tray information, such as a reserved job which requires plural sheet trays can be recognized, and sheet tray information of jobs including the job under outputting prints can be recognized.

On the horizontal axis representing time axis of job schedule screen 300, numerical numbers are displayed corresponding to the display scale having been set, which enables to visually recognize the required time for each job. For example in the case where full display scale is 30 minutes, numeric characters of 0, 10, 20, and 30 are displayed. At bottom center portion of job schedule screen 300, zoom buttons to change the display scale are indicated. Zoom buttons are configured with a reduction button 320 for reducing the display scale and an enlargement button 322 for enlarging the display scale. Users can freely change the display scale by selectively operating reduction button 320 or enlargement button 322. The range of switching the display scale is, for example, 23 steps from minimum 30 minutes to maximum 24 hours in full scale.

Time information corresponding to the display scale of job schedule screen 300 is stored in nonvolatile memory 46 every time of switching the display scale. For example, at the time of power ON, at the time of mode transition, and at the time of screen transition from other screen, the time information stored in nonvolatile memory 46 is read out, and based on this time information the numerical numbers on the time axis of job schedule screen 300 are displayed.

In job schedule screen 300, a reserved job and a job on outputting are displayed by job bars (job images) JB based on used sheet tray, execution order of the job, and residual time. In the present example, job bars JB1-JB7 respectively corresponding to seven reserved jobs 1-7 are displayed on job schedule screen 300, in ascending execution order along the time axis from left end of the screen. The borders of adjoining jobs (job bar JB) are indicated by dotted separation lines in FIGS. 3-8, however adjoining jobs may be discriminated by alternately displaying with dark and light background colors. For example, job 5 is displayed on the position of tray 2 in the vertical axis and in the fifth job display area separated by dotted lines.

Length of job bar JB in the direction of time axis indicates a job execution time (residual time). For example, as shown in FIG. 3, in the case of job 5 the execution time is approximately 1 minute 40 seconds. Wherein, by adding up the other job bars JB, an clock time of execution for a selected job can be known. For example, by adding up the execution times of jobs 1-4, the clock time of execution for job 5 is known to be approximately 3 minutes.

Further, in order to display residual number of sheet S in the connected sheet trays, job bars JB are displayed with separate colors. In FIGS. 3-8, blue job bar JB is indicated by shaded bar and red job bar JB is indicated by void bar. In the drawings, shaded job bars JB (JB1, JB2, JB3, JB4, JB5, and JB6) indicate that sufficient sheet S are accommodated in the sheet trays, and printing is capable. Further, void job bars JB (JB3 and JB7) indicate the status that no sheet S is available in the sheet tray, or print outputting will be stopped due to shortage of sheet S. Thus, users can visually recognize the status of sheet trays and can recognize beforehand the necessity of sheet supply. Two colors are used for color discrimination in the example however, three or more colors may be used.

[Configuration Example of Pop-up Screen]

Next, pop-Up screen 400 will be described. When a specific job bar JB is pushed by a touch operation or a cursor operation among the displayed plurality of job bars, a pop-up screen 400 corresponding to the selected job bar JB is displayed on upper or lower side of the job bar JB. In this pop-up screen 400, displayed are job setting information including a job ID of the selected job bar JB, file name, paper size, paper type and paper weight, and a close button 420 for closing pop-up screen 400.

For example when job bar JB2 (see FIG. 3) of job 2 is selected, at the under side of job bar JB2, pop-up screen 400A is displayed. In pop-up screen 400A, displayed are detailed job setting information 410 of job 2 such as job ID: 0002, file name: for AB printing, paper size: A4, paper type: high quality paper, paper weight: 62-71 g, and the like.

Figure 5:
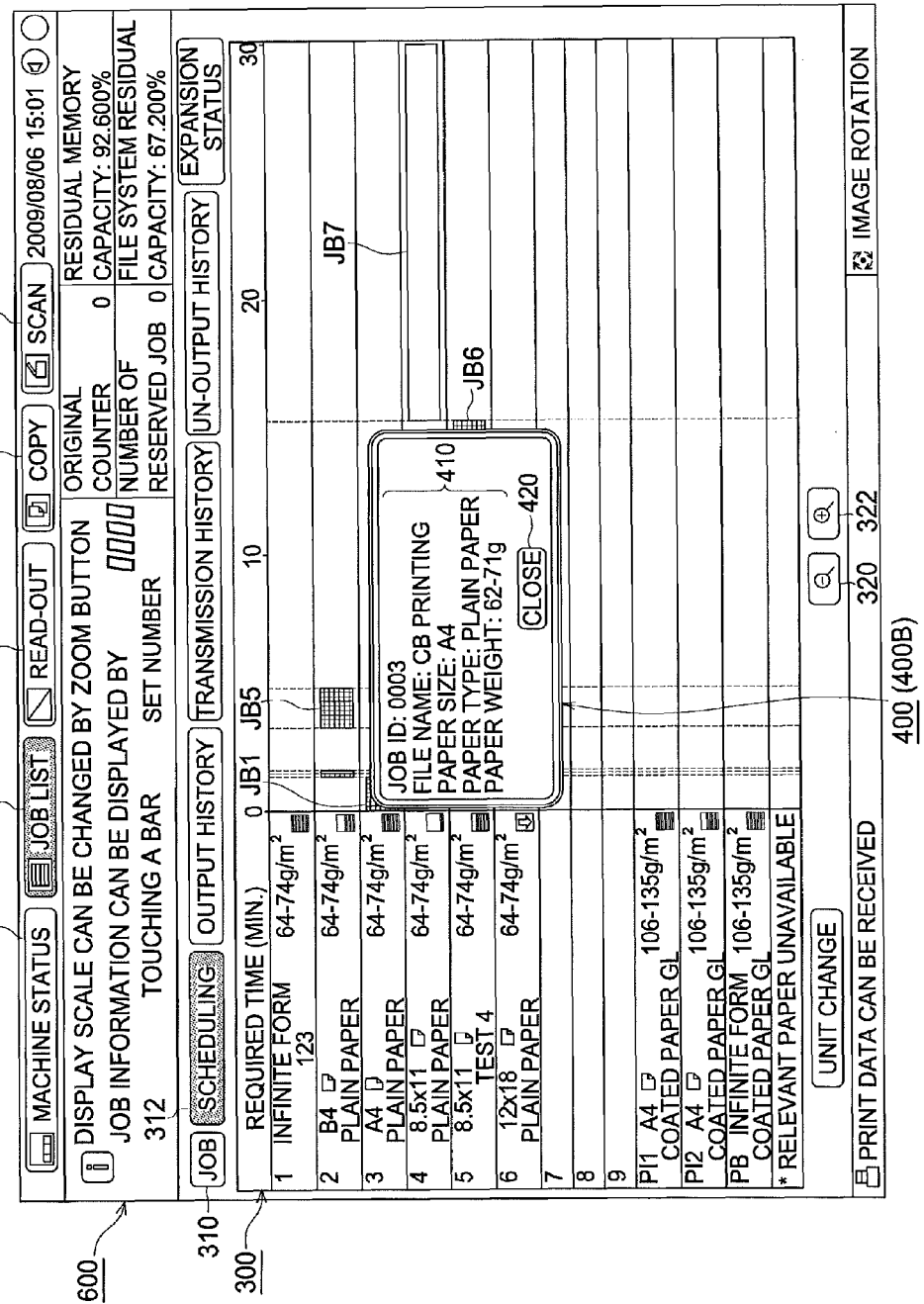
FIG. 5 is a drawing that illustrates a configuration example of a job schedule screen (example 3)

Subsequently, when close button 420 of pop-up screen 400 is pushed and job 3 (see FIG. 3) adjoining to job 2 is pushed, at the under side of job bar JB3, pop-up screen 400B is displayed as shown in FIG. 5. In pop-up screen 400B, displayed are detailed job setting information 410 of job 3 such as job ID: 0003, file name: CB printing, paper size: A4, paper type: plain paper, paper weight: 62-71 g, and the like.

[Configuration Example of Job Schedule Screen after Display Scale Change]

Figure 6:
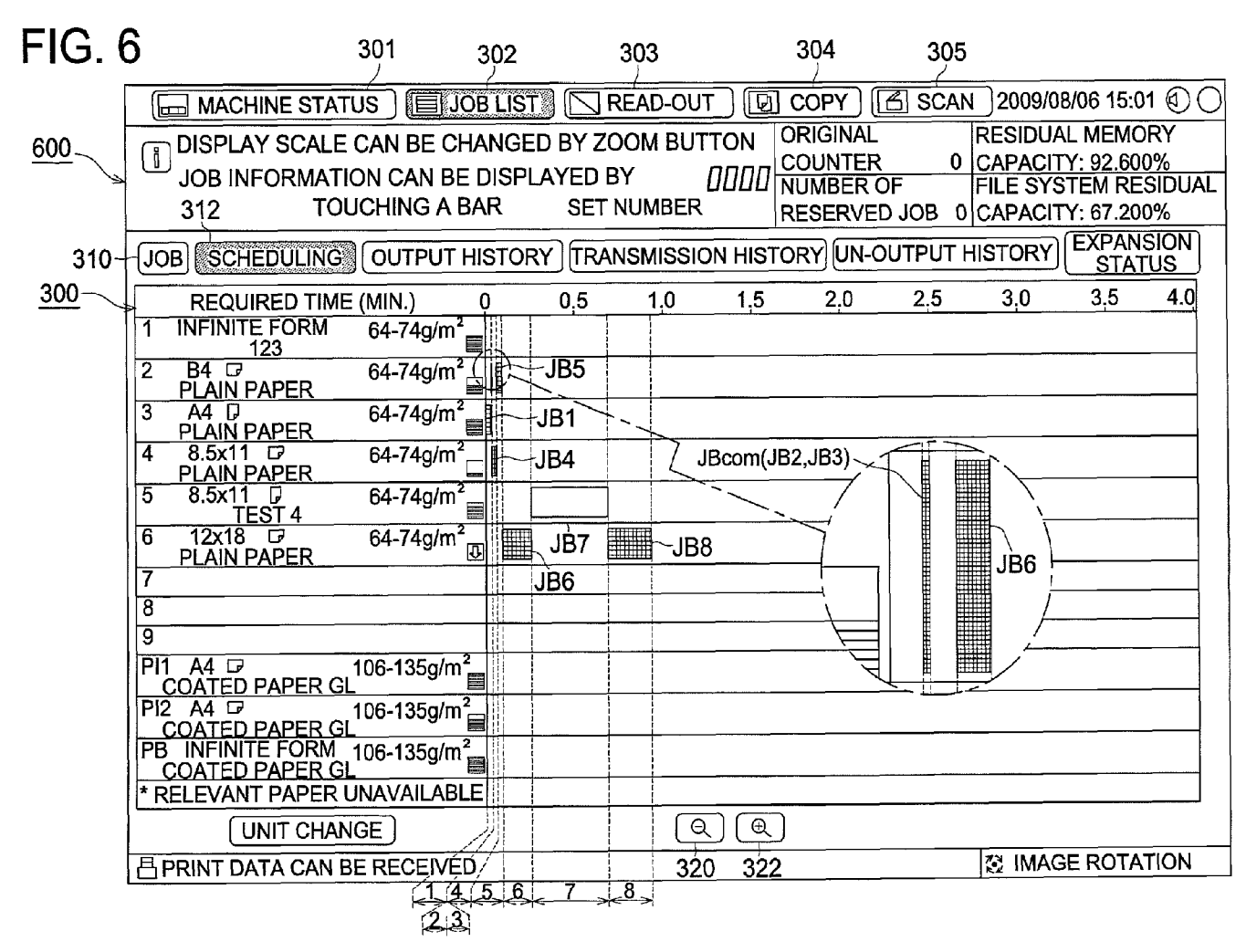

Next, a configuration example of job schedule screen 300 after the change of display screen will be explained. When reduction button 320 shown in FIG. 6 is selected, the display scale is reduced sequentially or in stepwise. When reduction button becomes in un-operated state, the reducing of the display scale is stopped. In this example, a case where the display scale is changed from "30 minutes" as shown in FIG. 3 to "4 hours" as shown in FIG. 6 is explained. On the horizontal axis indicating the time axis of job schedule screen 300, numerical numbers of 0, 0.5, 1.0, . . . 3.0, 3.5, 4.0 are displayed. Meanwhile, by reducing the display scale, job 8 which was not shown in "30 minutes" display scale is displayed.

In cases where the display sizes of each of adjoining two job bars JB becomes not larger than the minimum display unit when the display scale is changed to a large scale (when display size is reduced), said two job bars are displayed as the overlapped images in one and the same area. Here, the one and the same area is an area for displaying the adjoining job bars that became not larger than the minimum display unit, and said area can be arbitrarily set by a user. For example, in cases where the minimum display unit is set to be one pixel, the consecutive two job bars JB are displayed by the minimum display unit of one pixel.

To be more specific, in cases where each of the two consecutive job bars JB2 and JB3 shown in FIG. 3 becomes not larger than the minimum display unit by reduction, job bar JB2 and job bar JB3 are displayed as a single bar JBcom in appearance as shown in FIG. 6 in the display area arranged at a boundary area between job 1 and job 4. Although, job bar JB2 is overlapped upon job bar JB3 in this example, job bar JB3 may be overlapped upon job bar JB3.

Figure 7:
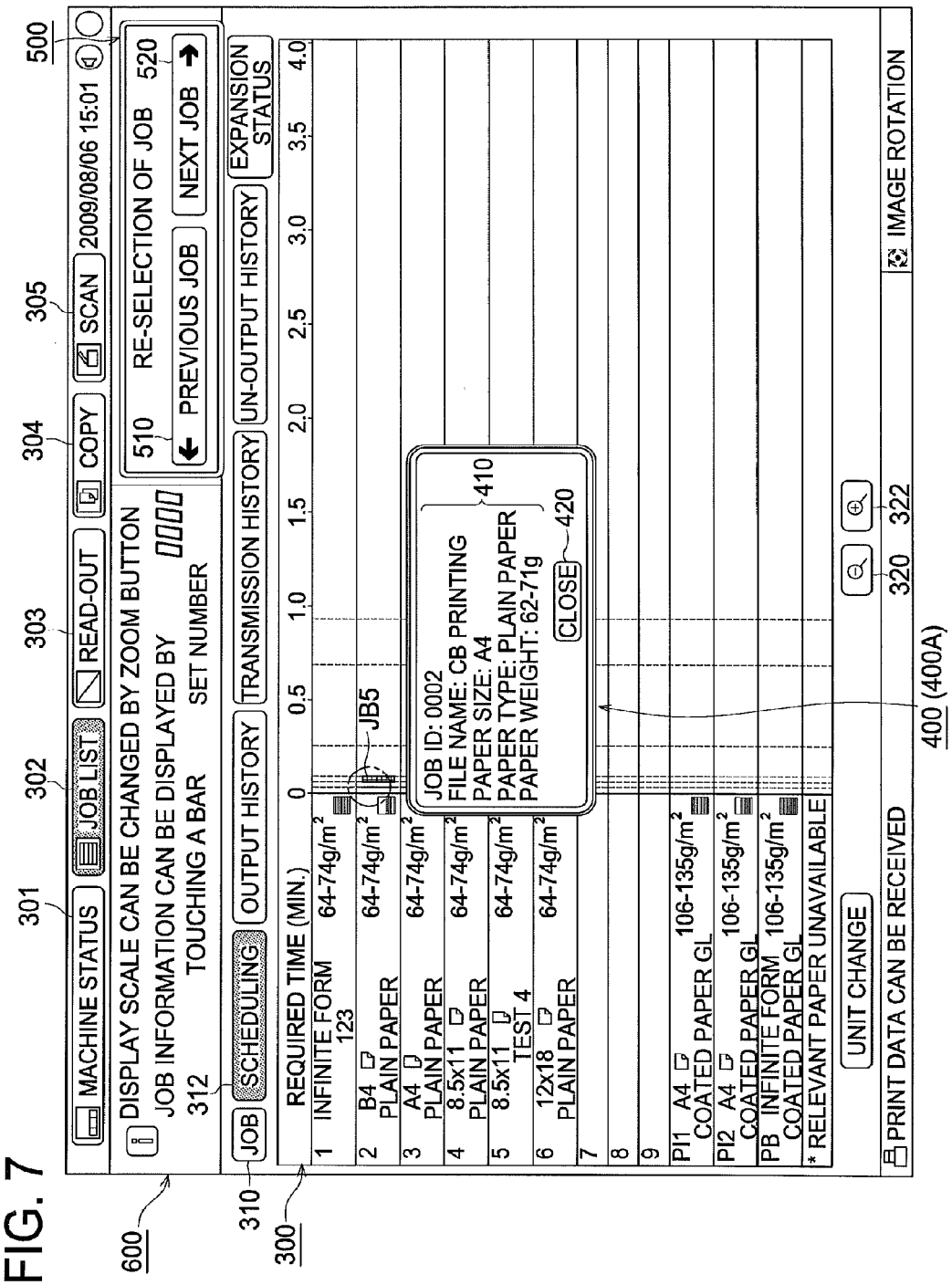
FIG. 7 is a drawing that illustrates a configuration example of a job schedule screen after a change of display scale (example 2)

When job bar JBcom where a plurality of jobs are overlapped is selected, popup screen 400 is displayed, which corresponds to any of the job bars JB among the plurality of overlapped job bars JB. For example, as shown in FIG. 7, in cases where job bar JBcom in which job bar JB2 and job bar JB3 are overlapped is selected, for example, popup screen 400A corresponding to job bar JB2 is displayed out of the two job bars.

Figure 8:
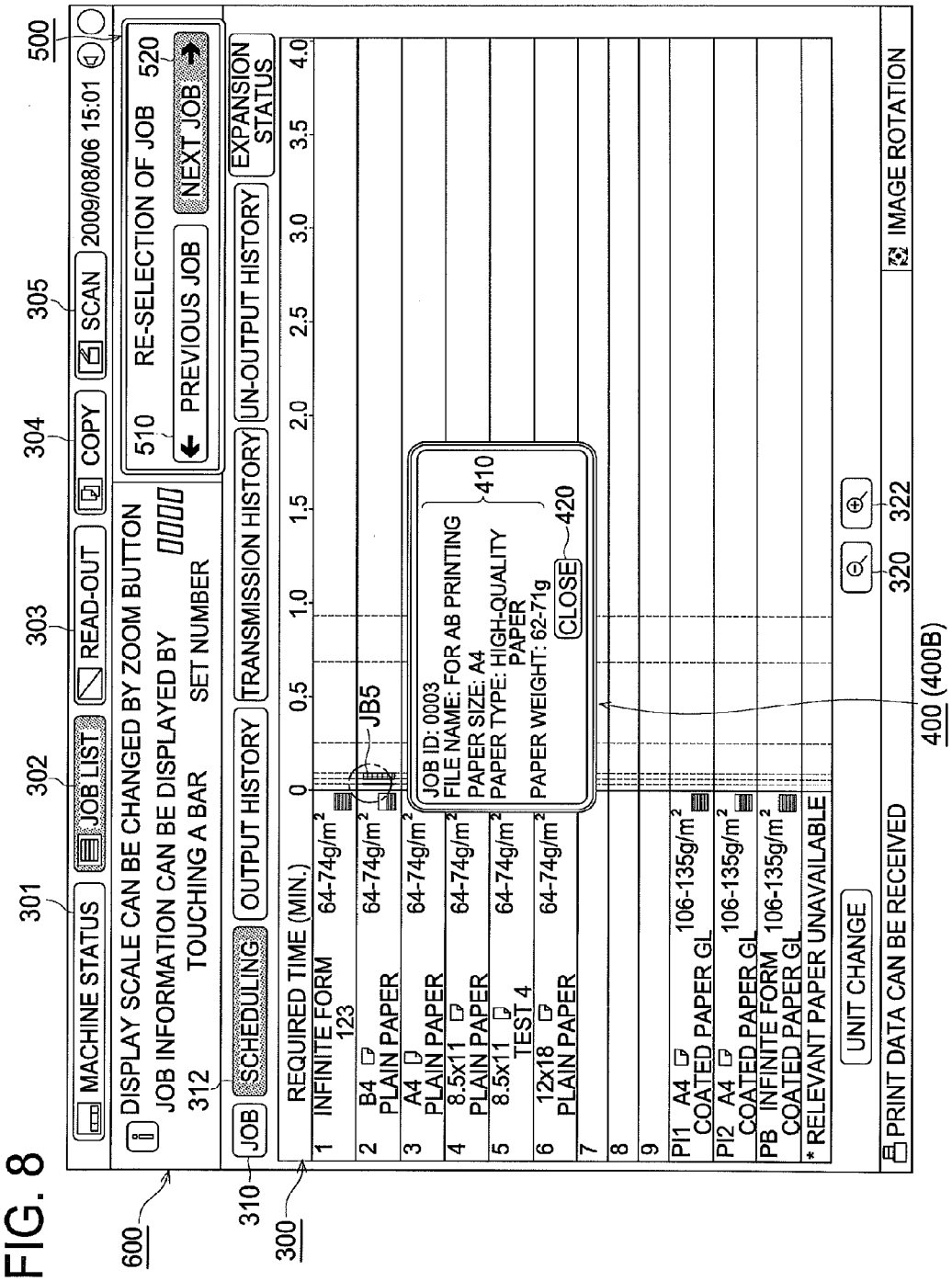
FIG. 8 is a drawing that illustrates a configuration example of a job schedule screen after a change of display scale (example 3)

At the same time when popup screen 400A is displayed, job re-selection screen 500 is displayed on the upper right side of job schedule screen 300. Job re-selection screen 500 is an operation screen to display job setting information 410 of a job different from the job whose job setting information 410 is popup displayed. Job setting screen 500 is configured with previous job selection button 510 for selecting the previous job, and next job selection button 520 for selecting the next job. For example, as shown in FIG. 8, in cases where next job selection button of job re-selection screen 500 is selected, popup screen 400B corresponding to job bar JB3 next to job bar JB2, whose popup screen is presently displayed, is displayed out of the two job bars overlapped in job bar JBcom.

[Example of Behavior at the Time of Job Schedule Screen Display]

Next, an example of behavior of image forming apparatus 100 relating to the present invention will be described with referring to FIG. 2, FIG. 3, and FIG. 9. Firstly, in a case where displaying job schedule screen 300 is requested, a behavior example of image forming apparatus 100 will be described.

Figure 9:
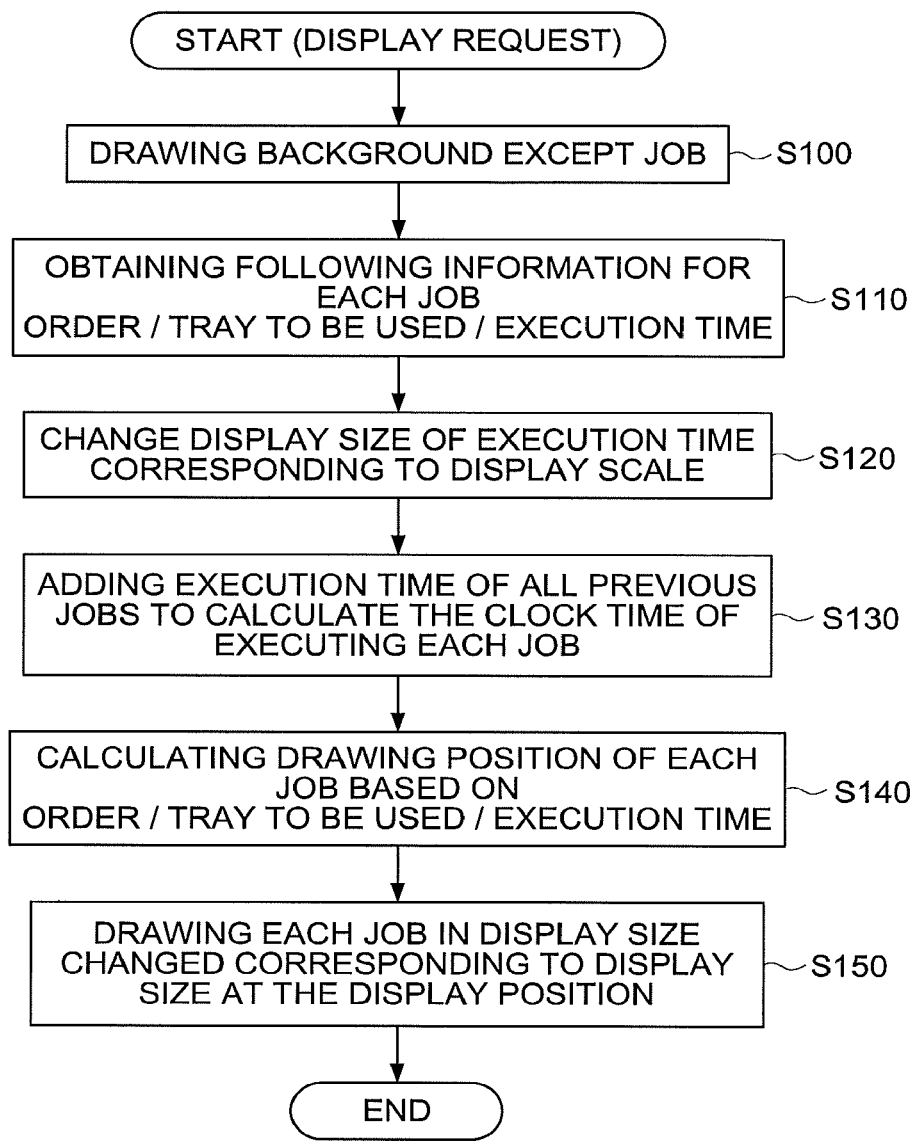
FIG. 9 is a flow chart showing a behavior example of an image forming apparatus (example 1)

As shown in FIG. 9, in step S100 image control section 42 draws a background of job schedule screen 300 excepting job bars JB, when scheduling button 312 is selected by an operation of operation section 64. The background includes displays of sheet size in the connected sheet tray, numeric numbers corresponding to the display scale, reduction button 320, enlarge button 322, and the like.

In step S110, image control section 42 reads out and obtains job setting information 410 for each job including order number of execution, sheet tray to be used, and execution time period, from HDD 58. For example, in the case of job 5, image control section 42 obtains information including order number of job execution: 5th, sheet tray to be used: tray 2, and execution time period: 1 minute and 40 seconds.

In step S120, image control section 42 converts the obtained execution time period to a display size corresponding to the display scale. Namely, image control section 42 calculates a length of job bar JB corresponding to each job in the time axis direction based on the display scale having been set and the execution time period of the job.

In step S130, image control section 42 adds up execution time periods of all jobs prior to each job, and calculates an execution clock time of the each job (starting time of the job). For example, in a case of job 5, by adding up the execution time periods of job 1 to job 4 whose execution orders are arranged prior to the execution order of job 5, as shown in FIG. 3, the execution clock time of the job 5 is calculated.

In step S140, image control section 42 calculates a drawing position of each job in job schedule screen 300 based on job setting information 410 including order of the job execution, sheet tray to be used, and execution time period, and execution clock time. For example, in the case of job 5, based on job setting information 410 including order of job execution: 5th, sheet tray to be used: tray 2, and execution time period: 1 minute and 40 seconds, calculates the drawing position of job 5 in job schedule screen 300.

In step S150, image control section 42 draws job bar JB of each job at the drawing position with the display size of each job converted corresponding to the display scale. Regarding job 5, for example, as shown in FIG. 3, image control section 42 draws job bar JB5 on a column of sheet tray to be used "tray 2", with writing start position at order number of job execution "5th", and with the length (display size) of job bar JB5 corresponding to the job execution time period "1 minute and 40 seconds", on job schedule screen 300.

[Example of Behavior at Display Scale Change]

Figure 10:
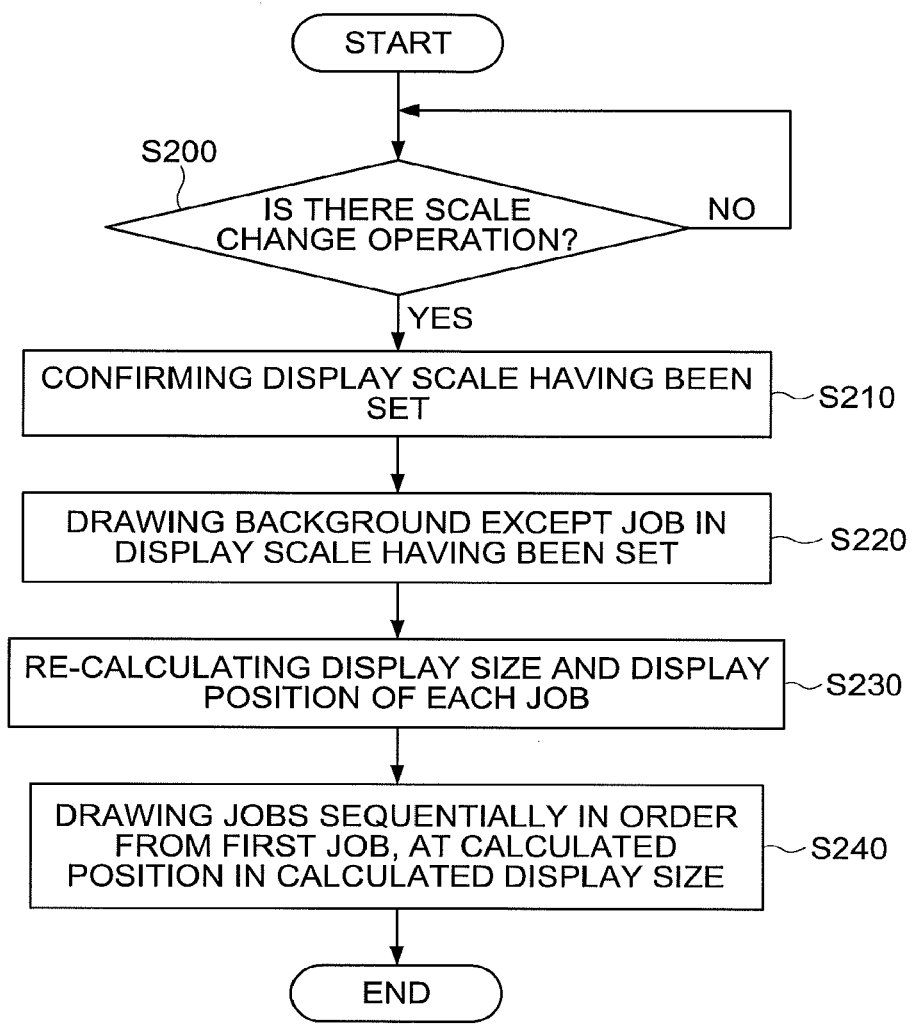
FIG. 10 is a flow chart showing a behavior example of the image forming apparatus (example 2)

Next, in job schedule screen 300, an example behavior of image forming apparatus 100 in cases where the display scale is changed is described by referring to FIG. 6 and FIG. 10. In this example, a case is described where changing operation of reducing the display scale is conducted.

As shown in FIG. 10, in step S200, image control section 42 determines whether operation of display scale change is conducted or not. Image control section 42 determines whether operation of display scale change is conducted or not based on whether an operation signal is supplied or not from operation section 64 by an operation of zoom button (reduction button 320 or enlargement button 322). In a case where image control section 42 determines that operation of display scale change is conducted, image control section 42 proceeds to the step S210, and in a case where operation of display scale change is not conducted, waits until the display scale change is conducted.

In step S210, image control section 42 confirms the display scale having been set with change. After confirming the display scale having been set based on the operation signal supplied from operation section 64, image control section 42 calculates a conversion ratio of the display scale based on the display scale before changed and the display scale after changed.

In step S220, display section 62 draws again the background excepting job bar JB with the display scale having been changed. Since the display sizes of such as the connected sheet tray, reduction button 320 and enlargement button 322 are not changed by before and after the scale change, objects of re-drawing in the background are such as numerical numbers indicating the display scale. For example, in cases where display scale is changed from "30 minutes" to "4 hours", the horizontal axis indicating the time is changed, as shown in FIG. 6, from "0, 10, 20, 30" to "0, 0.5, 1.0, . . . 3.5, 4.0".

In step S220, image control section 42 re-calculates a display size and a drawing position of each job based on the changed display scale. For example, image control section 42 re-calculates the display size (length in time axis direction) and drawing position of the job bars JB by utilizing the conversion ratio calculated based on the display scale before change and the display scale after change.

Further image control section 42 determines whether or not the re-calculated display size of the job bar JB is not larger than the predetermined minimum display unit. In cases where image control section 42 determines that the re-calculated display size of the job bar JB is larger than the predetermined minimum display unit, image control section 42 supply image information based on the re-calculated display size of the job bar JB to display section 62. While, in cases where image control section 42 determines that the re-calculated display size of the job bar JB is not larger than the predetermined minimum display unit, image control section 42 successively determines whether or not a job bar JB determined to be not larger than the minimum display unit exists in succession. Namely, image control section 42 determines whether or not two or more adjacent job bars JB, determined to be not larger than the minimum display unit, exist.

In cases where image control section 42 determines that successive job bars JB determined to be not larger than the minimum display unit exist, in order to display the successive job bars JB at a same display area with overlapping, in addition to re-calculating the display size and drawing position of the job bars JB, adds for example overlapping display information to job setting information 410. While, in cases where image control section 42 determines that a job bar JB not larger than the minimum display unit does not exist adjacent to a certain job bar JB not larger than the minimum display unit, image control section 42 changes the display size and position of the job bar JB in order to display the certain job bar JB in the minimum display unit.

In step S240, display section 62 draws job bar JB of each job sequentially in order from the first job at calculated drawing position with calculated display size. In cases where each of a plurality of consecutive job bars becomes not larger than the minimum display unit due to the reduction of display scale, the plurality of consecutive job bars JB are drawn as overlapped images in a same display area. For example, as shown in FIG. 6, in the case where each of job bar JB2 and job bar JB3 becomes not larger than the minimum display unit, job bar JBcom which is composed of overlapped JB2 and JB3 is displayed on a column of sheet tray position "tray 2", and at a boundary portion between the positions of job 1 and job 4 on the time axis.

[Example of Behavior at Job Schedule Screen Operation]

Figure 11:
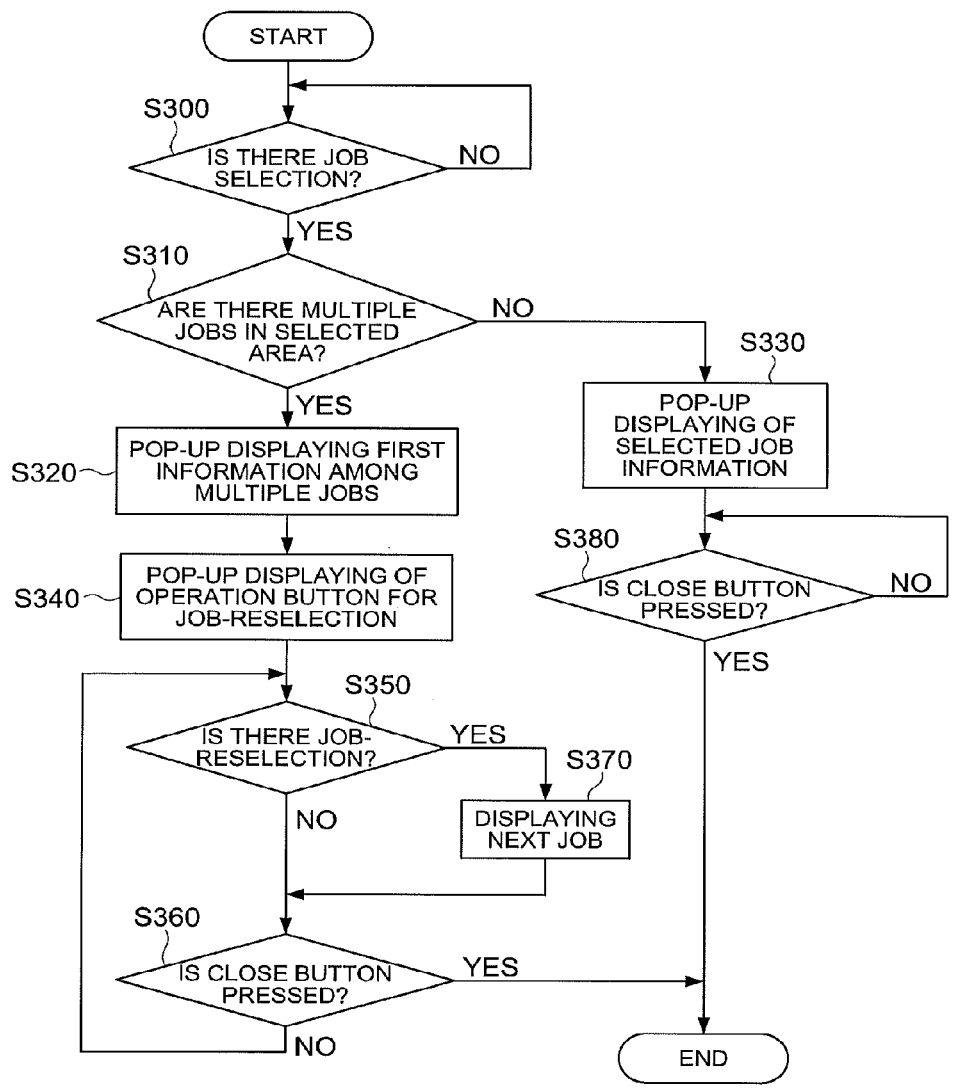
FIG. 11 is a flow chart showing a behavior example of the image forming apparatus (example 3).

Next, the behavior of image forming apparatus 100 after the scale change (reduction) of job schedule screen 300 will be described. As shown in FIG. 11, image control section 42 determines, in step 300, whether or not a selection operation of a specific job bar JB is executed on job schedule screen 300. Here, image control section 42 controls such that each of job bar JB indicating a single job and job bar JBcom indicating overlapped multiple job bars is selectable. In a case where a selection operation for a specific job bar JB is executed the flow moves to step S310. On the other hand in a case where any specific job bar JB is not determined to be selected, the flow waits until a selection operation is executed.

In step 310, image control section 42 determines whether or not a plurality of jobs exist in the display area of selected job bar JB. Namely, image control section 42 determines whether or not the selected job bar is job bar JBcom indicating overlapped plurality of jobs, based on overlapping display information (job setting information 410) included in each job. Image control section 42 proceeds to step S320 in a case where determined is that a plurality of jobs exist in the selected display area, and proceeds to step S330 in a case where determined is that a plurality of jobs do not exist in the selected display area.

In step S320, display section 62 popup-displays job setting information 411 of a job of the first order in the plurality of overlapped jobs. For example, as shown in FIG. 7, image control section 42 reads out job setting information 410 (including execution order number) included in job 2 and job 3 from HDD58, and allows to display the job 2 which has prior execution order in job 2 and job 3.

In step S340, display section popup-displays reselection screen 500 for re-selecting the job. As shown in FIG. 7, job reselection screen 500 is displayed on job schedule screen 300, by being read out from image memory 48 through the control of image control section 42, at the same time when popup screen 400A of the selected job bar JB2 is displayed. By operation of this job reselection screen 500, each job of the plurality of jobs overlap displayed in job bar JBcom can be selected.

In step S350, image control section 42 determines whether or not reselection operation of jobs is executed on job reselection screen 500. Specifically, image control section 42 determines whether previous job selection button 510 is selected or next job selection button 520 is selected in job reselection screen 500. In a case where the job reselection operation is determined to be executed, proceeds to step S370, and in a case where the job reselection operation is determined not to be executed, proceeds to step S360.

In step S370, display section 62 displays popup screen 410 corresponding to the previous job or the next job, based on the selection operation on job reselection screen 500. For example, as shown in FIG. 8, in a case where next job selection button 520 is selected, display section displays popup screen 400B corresponding to job 3 which has a later execution order next to that of job 2 whose job setting information 410 is presently displayed. At this time, since job bar JB1 which has a prior execution order is not displayed being overlapped in JBcom, previous job selection button 510 may be displayed with shading so as not be selected.

In step S360, image control section 42 determines whether or not close button 420 of presently displayed popup screen 400 in job schedule screen 300 is selected (see FIG. 7 and FIG. 8). In cases where image control section 42 determined that close button 420 is not selected, returns to step S350 and waits in a condition where the presently displaying screen, for example, popup screen 400A (or 400B) and job reselection screen 500 are displayed. On the other hand, in cases where determine is that close button 420 is selected, erases popup screen 400A (or 400B) and job reselection screen 500 from job schedule screen 300 and returns to job schedule screen 300.

In step S310, in cases where image control section 42 determined that multiple jobs are not exist in the selected display area, job setting information 410 of the selected job is popup displayed as usual in step S330.

In step S380, image control section 42 determines whether or not close button 420 of popup screen 400 presently displayed in job schedule screen 300 is selected. In cases where image control section 42 determined that close button 420 is not selected, waits in a condition of displaying the presently displayed popup screen 400 and job reselection screen 500. On the other hand, in cases where image control section 42 determined that close button 420 is selected, erases popup screen 400 and job reselection screen 500 and return to job schedule screen 300.

As described above, according to the present embodiment, even in cases where two or more job bars are displayed as overlapped in one and the same display area due to the reduction of display scale, a selection operation of each job from the plurality of job bars overlap displayed in JBcom is enabled by the operation of job reselection screen 500. By this, operations such as changing the display scale of each job bar JB up to visible size can be eliminated. Due to this, even incases where the display scale is set in large unit, the selection operation of each job is enabled and a total view of the jobs can be also visually confirmed, thus improvement of operability is achieved.

According to the present embodiment, by a reselecting operation of the job image displayed with overlapping in the same display area, job setting information of the job different from that displayed in the present screen can be displayed. Thus, operation of changing the display scale of each of the job images displayed with overlapping up to visible size can be eliminated.

Further, according to the present embodiment, such as residual time of each job and the sheet tray to be used can be visually confirmed, and user's action such as supply or exchange of recording sheets is enabled to be predictable beforehand.

Further, according to the present embodiment, in cases where the display sizes of job images after changing the display scale become not larger than the minimum display unit, the job images are displayed with overlapping, therefore, the disappearing problem of two or more job images from the screen can be solved.

Technical scope of the present invention is not limited to the above described embodiment, but includes various modifications without departing from the spirit and scope of the present invention. In the above described embodiment, the selection of other overlap displayed job bar JB is enabled by operating job reselection screen 500, but not necessarily restricted to this. For example, job setting information 410 of any of the jobs is displayed at the time of firstly selecting job bar JBcom, and at the time of second selection of job bar JBcom job setting information 410 of other job different from the presently popup displayed job may be displayed. According to this method, each of the overlapped displayed jobs can be selected without using job reselection screen 500.

Further, in the above embodiment, when job bar JBcom is selected job setting information of the first ordered job among the overlap displayed jobs is popup displayed, however it is not necessary to restrict to this case. For example, job setting information 410 of the last execution order job or an arbitrary job among the overlap displayed jobs may be displayed.

What is claimed is:

1. An image forming apparatus for executing a job to form an image based on image data, the image forming apparatus comprising:
    a plurality of sheet trays;
    an image forming section which forms the image on a sheet supplied by the sheet trays; and
    a display section which includes a display screen, upon which are displayed a first axis and a second axis,
    wherein sheet tray information identifying each of the plurality of sheet trays is displayed individually for each tray along the first axis, and a plurality of job bars corresponding to jobs scheduled for each of the sheet trays is displayed along the second axis at a position along the first axis where the sheet tray information for the respective sheet tray is located,
    wherein the display section displays a pop-up screen displaying job setting information corresponding to a job bar of a job selected by a user among the job bars of jobs scheduled for each of the sheet trays, and
    wherein information concerning an amount of the sheets accommodated in each of the sheet trays is displayed correspondingly to each of the sheet tray information.

2. The image forming apparatus as claimed in claim 1, wherein the sheet tray information includes a type of sheet.

3. The image forming apparatus as claimed in claim 1, wherein the job bars represent information concerning a residual sheet amount of each of the sheet trays.

4. The image forming apparatus as claimed in claim 1, wherein each job bar corresponds to a single job.

5. The image forming apparatus as claimed in claim 1, wherein the first axis is vertical and the second axis is horizontal.

6. The image forming apparatus as claimed in claim 1, wherein the job bars represent the start and end time of each job.

7. A display device for displaying a schedule of a job executed in an image forming apparatus, the image forming apparatus including a plurality of sheet trays and an image forming section which forms an image on a sheet supplied by the sheet trays in order to form the image based on image data, the display device comprising:
    a display section which includes a display screen, upon which are displayed a first axis and a second axis,
    wherein sheet tray information identifying each of the plurality of sheet trays is displayed individually for each tray along the first axis, and a plurality of job bars corresponding to jobs scheduled for each of the sheet trays is displayed along the second axis at a position along the first axis where the information for the respective sheet tray is located,
    wherein the display section displays a pop-up screen displaying job setting information corresponding to a job bar of a job selected by a user among the job bars of jobs scheduled for each of the sheet trays, and
    wherein information concerning an amount of the sheets accommodated in each of the sheet trays is displayed correspondingly to each of the sheet tray information; and
    an operation section which detects input information based on a selected prescribed item when the prescribed item is operated with an input operation by the user on the display screen.

8. The display device as claimed in claim 7, wherein the sheet tray information includes a type of sheet.

9. The display device as claimed in claim 7, wherein the job bars represent information concerning a residual sheet amount of each of the sheet trays.

10. The display device as claimed in claim 7, wherein each job bar corresponds to a single job.

11. The display device as claimed in claim 7, wherein the first axis is vertical and the second axis is horizontal.

12. The image forming apparatus of claim 1, wherein the job setting information includes at least one of a job ID of the selected job, file name, paper size, paper type and paper weight.

13. The display device of claim 7, wherein the job setting information includes at least one of a job ID of the selected job, file name, paper size, paper type and paper weight.

* * * * *